April 7, 1964   A. J. CHAMAY   3,127,740
CLUSTERED ROCKET NOZZLES
Filed Oct. 17, 1962
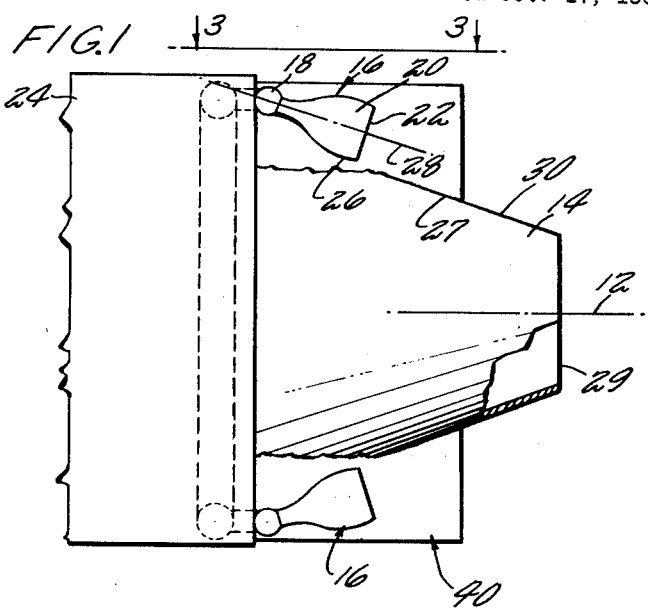
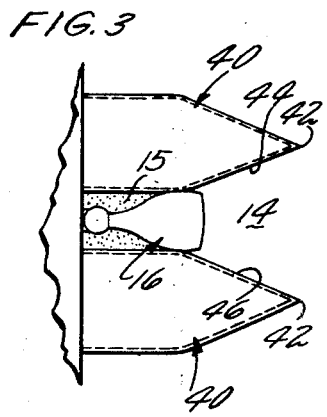
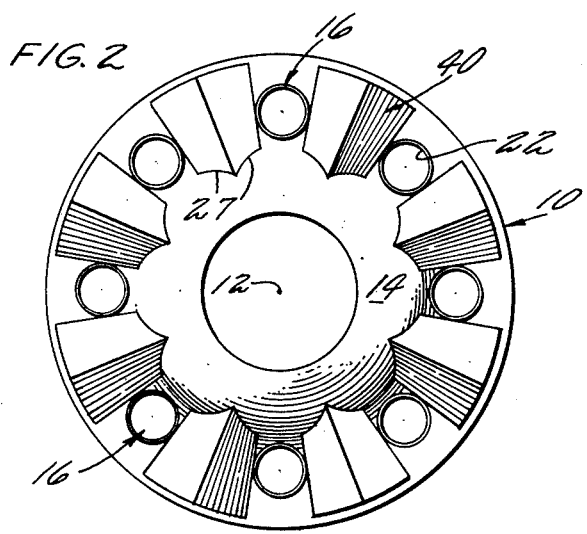
INVENTOR
ANTHONY J. CHAMAY
BY Vernon J. Hauschild
ATTORNEY

United States Patent Office 3,127,740
Patented Apr. 7, 1964

3,127,740
CLUSTERED ROCKET NOZZLES
Anthony J. Chamay, Andover, Conn., assignor to United
  Aircraft Corporation, East Hartford, Conn., a corporation of Delaware
Filed Oct. 17, 1962, Ser. No. 231,211
5 Claims. (Cl. 60—35.6)

This invention relates to a plug cluster engine and more particularly to the method and apparatus of increasing the thrust produced thereby.

It is an object of this invention to teach method and apparatus for increasing the thrust of a plug cluster engine or preferably a rocket engine.

It is an object of this invention to place expansion fairings between adjacent engines of a plug cluster powerplant to increase the thrust output thereof.

The use of such fairings will permit a reduction in engine length and therefore, a probable reduction in engine weight.

It still is a further object of this invention to position and shape the aforementioned pairing such that the exhaust fluid of each engine expands fully to atmospheric pressure thereagainst.

It is still a further object of this invention to teach the aforementioned expansion fairings and to shape them so that they are radially extending and taper, preferably to a point, at the after-end of the engine.

It is still a further object of this invention to provide insulation between the engine and the expansion fairings.

Other objects and advantages will be apparent from a reading of the following description taken in connection with the attached drawings which are:

FIG. 1 is a side view, partially broken away, of a powerplant using a plug cluster rocket to produce thrust.

FIG. 2 is a rear view of this powerplant.

FIG. 3 is a view taken along line 3—3 of FIG. 1

Referring to FIG. 1 we see my plug cluster powerplant 10. As is recognized in the art, a plug cluster powerplant or nozzle is one wherein a plurality of thrust producing engines, such as rocket engines, are positioned circumferentially about an expansion cone to direct their exhaust gases to expand against the expansion cone and thereby produce thrust. Insulation 15 is positioned around nozzle 16 as best shown in FIG. 3.

FIGS. 1 and 2 show plug cluster power plant 10 to be of substantially circular cross section and concentric about axis 12. Expansion plug or cone 14 is centrally located in engine 10 and concentric about axis 12 and tapers toward axis 12 in a rearward direction. As illustrated, expansion plug 14 is frusto-conical but it might be desirable, in some installations, to have plug 14 a complete cone or some geometric variation thereof. A plurality of rocket engines 16 are positioned circumferentially around plug 14 and each are preferably equally spaced from axis 12 and from each other. Engine 16 is illustrated as a rocket engine but could conceivably be any type of engine which produced thrust by discharging energized fluid to atmosphere. Rocket engine 16 includes a combustion chamber section 18 and thrust nozzle section 20 so that the products of combustion from combustion chamber 18 are discharged to atmosphere through outlet 22 of exhaust nozzle 20. Propellant will be provided to rocket engine 16 in the usual fashion from the body 24 of power plant 10. This description of the construction and operation of rocket engines 16 is considered sufficient for the present purpose and reference is hereby made to U.S. Patents #2,074,098, #2,523,-010, #2,637,161, #2,741,085, #2,808,701, #2,708,342, #3,028,729 and #2,930,187 for a more particular description of rocket engines 16 and its associated parts.

Each rocket engine 16 includes rocket case 26, which is preferably of circular cross section, and concentric about rocket axis 28 which converges toward axis 16 and toward the expansion surface 30 of plug 14. In operation the fuel and oxidizer burns within combustion chamber section 18 and expands through nozzle section 20 for eventual discharge of the energized fluid resulting therefrom to the atmosphere through outlet 22, whereupon it expands further in the atmosphere along expansion surface 30 of plug 14 to produce thrust on powerplant 10.

It is the teaching of my invention to produce additional thrust in a plug cluster nozzle by positioning expansion fairings 40 between adjacent engines 16. Expansion fairings 40 are substantially radially extending and equally spaced and positioned circumferentially and radially about axis 12. Fairings 40 taper, preferably to a point, to its downstream or after-end 42. Fairings 40 are so positioned and shaped that the energized fluid being discharged from outlet 22 of engine 16 will not only expand against expansion surface 30 of plug 14 but, as is best shown in FIG. 3, the energized fluid from each engine 16 will expand against expansion surfaces 44 and 46 of adjacent expansion fairings 40. Expansion fairings 40 are positioned and shaped so that the energized exhaust fluid from engines 16 will expand fully to atmospheric pressure and not therebeyond within adjacent fairings 40.

It will be noted that fairings 40 blend smoothly with plug 14 along line 27 so that there are no drag creating voids therebetween. Further, both plug 14 and fairings 40 are preferably hollow and in communication with the atmosphere and each other so that the low pressure, drag creating region which would otherwise form behind surface 29 of plug 14 will be prevented from forming (by a bleed action through hollow plug 14 and then hollow fairings 40 to atmosphere) since the area behind surface 29 will be in communication, through plug 14 and fairings 40, with atmospheric pressure external of fairings 40.

It is to be understood that the invention is not limited to the specific embodiment herein illustrated and described but may be used in other ways without departure from its spirit as defined by the following claims.

I claim:

1. A powerplant having a plurality of thrust producing engines which function by discharging energized exhaust fluid to atmosphere, an expansion plug positioned adjacent each of said engines and shaped so that energized exhaust fluid from said engines expands against said plug to generate thrust, and expansion fairings located between adjacent engines and extending from said plug and being positioned and shaped so that energized exhaust gas from said engines will also expand against said fairings to produce thrust.

2. A powerplant concentric about an axis and having a forward and an after-end, an expansion plug positioned about and tapering toward said axis toward said after-end, a plurality of rocket engines located circumferentially about said plug and concentrically about said axis and positioned to discharge exhaust gas to expand against said plug and thereby produce thrust, and an expansion fairing tapering to minimum thickness toward said afterend and positioned between adjacent engines and shaped so that said engines exhaust gases will expand against said fairing to thereby produce thrust.

3. Appratus according to claim 2 wherein said expansion fairings are substantially radially extending.

4. Apparatus according to claim 2 wherein said expansion fairings are so positioned and shaped that complete exhaust gas expansion to atmospheric pressure occurs therewithin.

5. Apparatus according to claim 2 and including insulating material in the space between said engines and said fairings.

References Cited in the file of this patent
UNITED STATES PATENTS
2,500,537     Goddard _____ Mar. 14, 1950

OTHER REFERENCES

Yaffee, M.: Vectorable Plug Cluster Nozzle Tested, in Aviation Week, March 27, 1961, pages 87–89, TL 501 A8.